United States Patent
Fujita (10) Patent No.: US 6,622,110 B2
(45) Date of Patent: Sep. 16, 2003

(54) ROTATION DIRECTION DETECTING APPARATUS

(75) Inventor: Yoshikazu Fujita, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 10/134,705

(22) Filed: Apr. 30, 2002

(65) Prior Publication Data

US 2002/0177973 A1 Nov. 28, 2002

(30) Foreign Application Priority Data

May 22, 2001 (JP) .................... P2001-152626

(51) Int. Cl.[7] ............ G01P 3/00; G06F 15/00
(52) U.S. Cl. ................... 702/145; 702/142
(58) Field of Search .............. 702/81, 82, 127, 702/142–145, 150–152, 163; 369/44.35, 47.53, 116

(56) References Cited

U.S. PATENT DOCUMENTS 4,931,940 A * 6/1990 Ogawa et al. ............ 702/151
5,005,164 A * 4/1991 Sakamoto et al. ........ 369/47.53
5,463,600 A * 10/1995 Kirino et al. ............ 369/13.24
5,689,756 A * 11/1997 Taki et al. ................. 399/33

FOREIGN PATENT DOCUMENTS

JP          2-12619 U       1/1990

* cited by examiner

*Primary Examiner*—Bryan Bui
(74) *Attorney, Agent, or Firm*—Morgan, Lewis & Bockius LLP (57) ABSTRACT

A rotation direction detecting apparatus including: a turntable 4 mounted on a rotary shaft 3 of a motor 2 and provided with a predetermined signal pattern, the predetermined signal pattern being formed so that reflection of light and non-reflection of light are repeated alternately and continuously by rotation of the motor 2; a photo-detector 5 for detecting the signal pattern of the turntable 4; and a micro-computer 7. The signal pattern is set as a pattern in which high-level regions and low-level regions are repeated alternately at a 2:1:1:2 ratio. The micro-computer 7 judges that the motor 2 is rotating in a direction of normal rotation when leading edges of the signal pattern detected by the photo-detector 5 are arranged at regular intervals, and judges that the motor 2 is rotating in a direction of reverse rotation when leading edges of the signal pattern detected by the photo-detector 5 are arranged at irregular intervals.

6 Claims, 5 Drawing Sheets

FIG. 3A  REFLECTION/NON-REFLECTION

FIG. 3B  CONVERSION INTO SIGNAL

FIG. 3C  LEADING EDGE AT THE TIME OF NORMAL ROTATION

FIG. 3D  LEADING EDGE AT THE TIME OF REVERSE ROTATION

FIG. 4A  SIGNAL PATTERN OUTPUT AT THE TIME OF NORMAL ROTATION

FIG. 4B  SIGNAL PATTERN OUTPUT AT THE TIME OF REVERSE ROTATION

FIG. 4C  SIGNAL PATTERN OUTPUT AT THE TIME OF REVERSE ROTATION

ROTATION DIRECTION DETECTING APPARATUS

BACKGROUND OF THE INVENTION

The present invention relates to a rotation direction detecting apparatus for detecting the direction of rotation of a motor. For example, the rotation direction detecting apparatus is preferably used for detecting the direction of rotation of a drive motor capable of driving various kinds of disk media to rotate in a CD player, a DVD player, a CD-ROM drive, a CD-R drive or a CD-RW drive.

Apparatus for detecting the direction of rotation or rotational velocity of a motor has been heretofore proposed variously.

For example, the Unexamined Japanese Utility Model Application Publication No. Hei2-12619 discloses a rotary encoder in which the size of a slit in a circular disc rotating in a gap of a photo interrupter is set into at least three kinds of widths. When the slit size is set into at least three kinds of widths as described above, the pulse width detected is elongated gradually at the time of clockwise rotation (normal rotation) and shortened gradually at the time of couterclockwise rotation (reverse rotation). Therefore, this rotary encoder is designed to detect the direction of rotation in accordance with the variation in pulse width (this rotary encoder being referred to as background art 1).

On the other hand, the Unexamined Japanese Patent Application Publication No. Hei4-50771 discloses a velocity detector for detecting information of the direction of rotation of a motor as variation in pulse width. That is, slits are provided in four concentric places of a circular disc mounted on a rotary shaft of a motor. These slits are formed so that one-hand edges of the slits are located in positions obtained by equally dividing the circular disc into four radially from the center of the circular disc. The four slits are formed concentrically and successively clockwise at a 1:2:3:4 length ratio. This velocity detector is designed to detect the direction of rotation in accordance with the variation in pulse width because the pulse width is elongated gradually at the time of normal rotation at a constant velocity and shortened gradually at the time of reverse rotation at a constant velocity (this velocity detector being referred to as background art 2).

As described above, in the background art 1 or the background art 2, it is necessary to measure both pulse width and pulse cycle. That is, in order to measure the pulse width, it is necessary to detect both leading and trailing edges of a signal. There is a problem that such edge detection is complicated. Moreover, the detected signal pattern is complex because three kinds of patterns are detected in the background art 1 and four kinds of patterns are detected in the background art 2. Moreover, in order to detect the direction of rotation, it is necessary to calculate signal pulse widths varying continuously as described above and compare the signal pulse widths with one another. There is another problem that detection of the direction of rotation is complicated.

SUMMARY OF THE INVENTION

The invention is designed to solve these problems, and an object of the invention is to provide a rotation direction detecting apparatus which can detect the direction of rotation and the rotational velocity of a motor by detecting only leading or trailing edges of a signal.

In order to solve these problems, according to the invention, there is provided a rotation direction detecting apparatus including: a turntable mounted on a rotary shaft of a motor and provided with a predetermined signal pattern, the predetermined signal pattern being formed so that reflection of light and non-reflection of light or transmission of light and non-transmission of light are alternately and continuously repeated by rotation of the motor; a photo-detecting unit for detecting the signal pattern of the turntable; a rotation direction judging unit for judging a direction of rotation of the motor on the basis of the signal pattern detected by the photo-detecting unit; and a velocity calculating unit for calculating a rotational velocity of the motor on the basis of the direction of rotation judged by the rotation direction judging unit, wherein: the signal pattern is set as a pattern in which high-level regions and low-level regions are repeated alternately at a 2:1:1:2 ratio; the rotation direction judging unit judges that the motor is rotating in a direction of normal rotation when leading edges of the signal pattern detected by the photo-detecting unit are arranged at regular intervals, and judges that the motor is rotating in a direction of reverse rotation when leading edges of the signal pattern detected by the photo-detecting unit are arranged at irregular intervals; and the velocity calculating unit calculates the rotational velocity of the motor on the basis of a distance between adjacent leading edges when the rotation direction judging unit judges that the motor is rotating in the direction of normal rotation, and calculates the rotational velocity of the motor on the basis of a distance between two leading edges located on opposite outer sides of three continuous leading edges when the rotation direction judging unit judges that the motor is rotating in the direction of reverse rotation.

According to the invention having such a feature, in a signal pattern which is set as a pattern making repetitions at a 2:1:1:2 ratio, as shown in FIGS. 3A to 3D, the distance between leading edges of the signal pattern at the time of normal rotation of the motor is a constant distance (time interval) t11 (=3t0) whereas the distance between leading edges of the signal pattern at the time of reverse rotation of the motor (that is, the distance between trailing edges of the signal pattern at the time of normal rotation of the motor) alternates between an arrow time interval t12 (=2t0) and a wide time interval t13 (=4t0). Therefore, only leading edges are always detected, so that the rotation direction judging unit judges that the motor is rotating in the direction of normal rotation when the distance between leading edges is a constant time interval t11 (=3t0), and judges that the motor is rotating in the direction of reverse rotation when the distance between leading edges alternates between a narrow time interval t12 (=2t0) and a wide time interval t13 (=4t0). In this manner, the direction of rotation can be detected accurately through simple calculation when only leading edges of the signal pattern are detected.

The velocity calculating unit calculates the rotational velocity of the motor on the basis of the distance t11 (=3t0) between adjacent leading edges when the rotation direction judging unit judges that the motor is rotating in the direction of normal rotation.

The velocity calculating unit also calculates the rotational velocity of the motor on the basis of the distance between two leading edges located on opposite outer sides of three continuous leading edges when the rotation direction judging unit judges that the motor is rotating in the direction of reverse rotation. That is, the rotational velocity of the motor rotating in the direction of reverse rotation cannot be calculated on the basis of only one of the time intervals t12 and t13 because the distance between adjacent leading edges alternates between the narrow time interval t12 (=2t0) and the wide time interval t13 (=4t0). That is, it is impossible to judge whether the given time interval belongs to the narrow one or the wide one. The rotational velocity of the motor rotating in the direction of reverse rotation, however, can be calculated on the basis of the constant time interval t14 (=6t0) because the distance t14 obtained by adding the narrow time interval t12 and the wide time interval t13, that is, the distance t14 between two leading edges located on opposite outer sides of three continuous leading edges is kept constant (2t0+4t0=6t0).

Further, according to the invention, there is provided a rotation direction detecting apparatus including: a turntable mounted on a rotary shaft of a motor and provided with a predetermined signal pattern, the predetermined signal pattern being formed so that reflection of light and non-reflection of light or transmission of light and non-transmission of light are alternately and continuously repeated by rotation of the motor; a photo-detecting unit for detecting the signal pattern of the turntable; and a rotation direction judging unit for judging a direction of rotation of the motor on the basis of the signal pattern detected by the photo-detecting unit and constituted by repetition of high- and low-level regions, wherein: the signal pattern is set so that adjacent leading edges of the signal pattern are arranged at regular intervals at the time of normal rotation of the motor whereas adjacent trailing edges of the signal pattern are arranged at intervals each having a value different from that of each of the regular intervals at the time of normal rotation of the motor; and the rotation direction judging unit judges the direction of rotation of the motor on the basis of a judgment as to whether leading edges of the signal pattern detected by the photo-detecting unit are arranged at regular intervals or at irregular intervals. That is, the rotation direction judging unit judges that the motor is rotating in a direction of normal rotation when leading edges of the signal pattern detected by the photo-detecting unit are arranged at regular intervals, and judges that the motor is rotating in a direction of reverse rotation when leading edges of the signal pattern detected by the photo-detecting unit are arranged at irregular intervals.

According to the invention having such a feature, the signal pattern is formed so that the distance between adjacent leading edges at the time of normal rotation of the motor is set to be constant where as the distance between adjacent trailing edges at the time of normal rotation of the motor is set to any desired value different from the former distance. That is, as shown in FIGS. 3A to 3D, the distance between leading edges at the time of normal rotation of the motor is set to be a constant time interval t11 whereas the distance between leading edges at the time of reverse rotation of the motor (that is, the distance between trailing edges at the time of normal rotation of the motor) is set to alternate between a narrow time interval t12 and a wide time interval t13. Therefore, only leading edges are always detected, so that the rotation direction judging unit judges that the motor is rotating in the direction of normal rotation when the distance between leading edges is a constant time interval t11, and judges that the motor is rotating in the direction of reverse rotation when the distance between leading edges alternates between a narrow time interval t12 and a wide time interval t13. In this manner, the direction of rotation can be detected accurately through simple calculation when only leading edges of the signal pattern are detected.

Further, in the rotation direction detecting apparatus according to the invention, the signal pattern is set as a pattern in which high-level regions and low-level regions are repeated alternately at a 2:1:1:2 ratio. As a result, the distance between leading edges at the time of normal rotation of the motor is a constant time interval t11 (=3t0) whereas the distance between leading edges at the time of reverse rotation of the motor (that is, the distance between trailing edges at the time of normal rotation of the motor) alternates between a narrow time interval t12 (=2t0) and a wide time interval t13 (=4t0). Therefore, only leading edges are always detected, so that the rotation direction judging unit judges that the motor is rotating in the direction of normal rotation when the distance between leading edges is a constant time interval t11 (3t0), and judges that the motor is rotating in the direction of reverse rotation when the distance between leading edges alternates a narrow time interval t12 (=2t0) and a wide time interval t13 (=4t0) In this manner, the direction of rotation can be detected accurately through simple calculation when only leading edges of the signal pattern are detected.

Further, according to the invention, the rotation direction detecting apparatus further includes a velocity calculating unit for calculating a rotational velocity of the motor on the basis of a distance between adjacent leading edges when the rotation direction judging unit judges that the motor is rotating in a direction of normal rotation, and for calculating a rotational velocity of the motor on the basis of a distance between two leading edges located on opposite outer sides of three continuous leading edges when the rotation direction judging unit judges that the motor is rotating in a direction of reverse rotation.

According to the invention having such a feature, the direction of rotation can be detected accurately through simple calculation when only leading edges of the signal pattern are detected.

DETAILED DESCRIPTION OF THE PREFERRED EMBODIMENTS

An embodiment of the invention will be described below with reference to the drawings.

Figure 1:
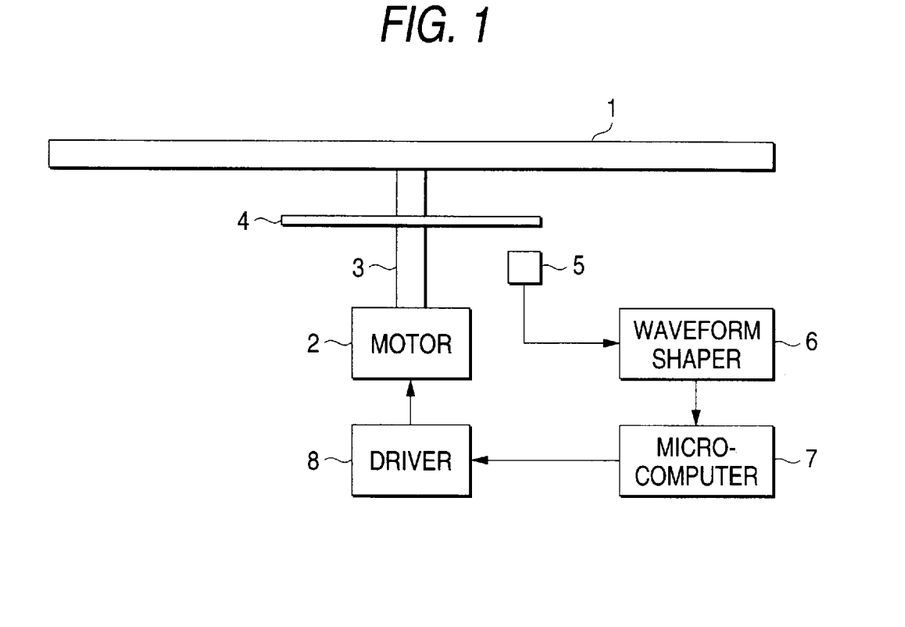
FIG. 1 is a schematic configuration view of a rotation direction detecting apparatus according to the invention.

FIG. 1 is a schematic configuration view of a rotation direction detecting apparatus according to the invention. The rotation direction detecting apparatus can be used for detecting the direction of rotation of a drive motor which is used in a CD player, a DVD player, a CD-ROM drive, a CD-R drive or a CD-RW drive for driving various kinds of disk media to rotate.

That is, a turntable 4 is mounted on a rotary shaft 3 of a motor 2. A disk 1 loaded into an apparatus body not shown is driven to rotate by the motor 2. The turntable 4 is provided with a predetermined signal pattern which is formed so that reflection of light and non-reflection of light (or transmission of light and non-transmission of light) are repeated alternately and continuously by rotation of the motor 2. A photo-detector 5 for detecting the signal pattern of the turntable 4 is disposed opposite to the turntable 4. In this embodiment, the photo-detector 5 is constituted by a reflective photo-detector. An output of the photo-detector 5 is introduced to a waveform shaper 6. An output of the waveform shaper 6 is connected to a micro-computer 7 which controls the operation of the apparatus totally.

Incidentally, the micro-computer 7 includes a CPU, a ROM, a RAM, etc. and controls a driver 8 which drives the motor 2 to rotate. The micro-computer 7 further controls a pickup which is not shown but reads data from the disk 1, and further controls a demodulator which is not shown but demodulates data read by the pickup. These components such as a pickup and a demodulator are not shown because they do not constitute the main part of the invention.

In this embodiment, the micro-computer 7 has a rotation direction judging function for judging the direction of rotation of the motor 2 (exactly, the direction of rotation of the turntable 4) on the basis of the signal pattern detected by the photo-detector 5, and a velocity calculating function for calculating the rotational velocity of the motor 2 on the basis of the result judged by the rotation direction judging function.

Figure 2:
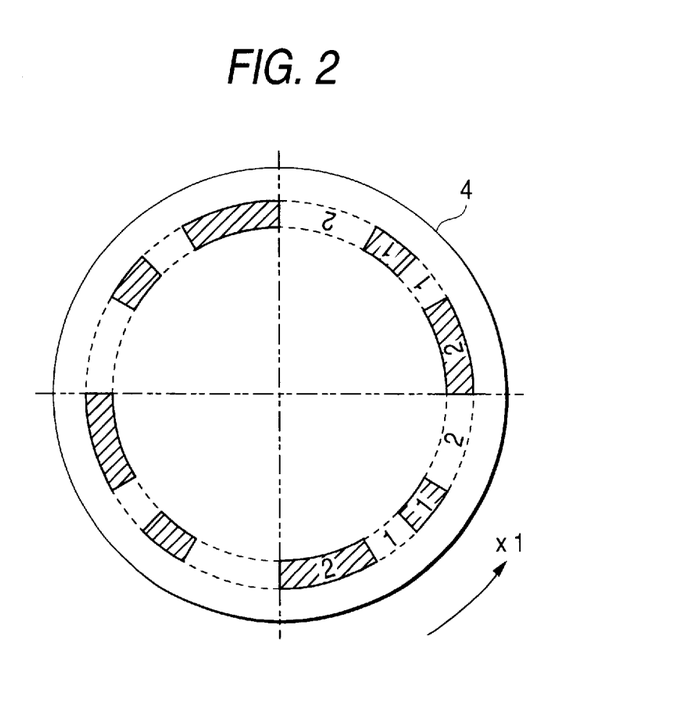
FIG. 2 is an explanatory view showing an example of the signal pattern formed in the lower surface of a turntable opposite to a photo-detector.

FIG. 2 shows an example of the signal pattern formed in the lower surface of the turntable 4 opposite to the photo-detector 5. In the signal pattern, high-level regions (hatched in FIG. 2) reflecting light and low-level regions (not hatched in FIG. 2) not reflecting light are formed alternately at a 2:1:1:2 ratio along a circumferential direction (that is, a direction of normal rotation represented by the arrow X1 in FIG. 2) in each of equal sections which are obtained by equally dividing the whole area into four in the direction X1 of normal rotation. That is, in this embodiment, the signal pattern constituted by high-level regions and low-level regions output alternately at a 2:1:1:2 ratio is continuously output by the photo-detector 5 four times on one rotation of the turntable 4.

In this manner, the signal pattern is formed in the lower surface of the turntable 4 so that high-level regions reflecting light and low-level regions not reflecting light are provided alternately and continuously at a 2:1:1:2 ratio along the direction X1 of normal rotation. When the signal pattern is detected by the photo-detector 5, the detected signal pattern is as shown in FIGS. 3A to 3D.

Figure 3A:
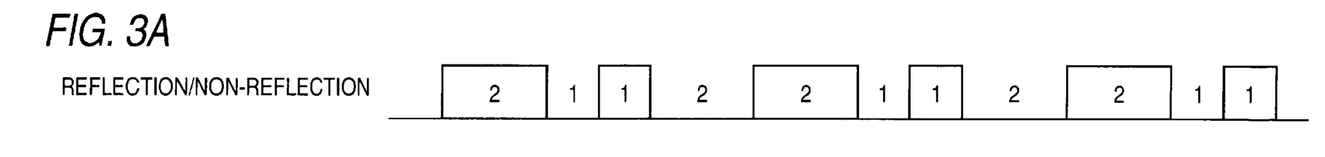
FIGS. 3A to 3D are explanatory views showing output signal waveforms in accordance with the detected signal pattern of the turntable by the photo-detector, and leading edges of the signal waveforms at the time of normal rotation and at the time of reverse rotation.
Figure 3B:
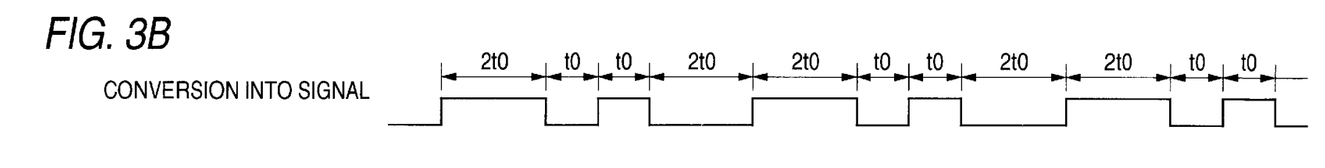
Figure 3C:
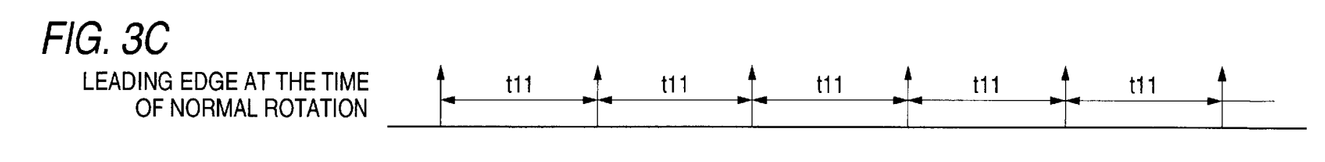
Figure 3D:
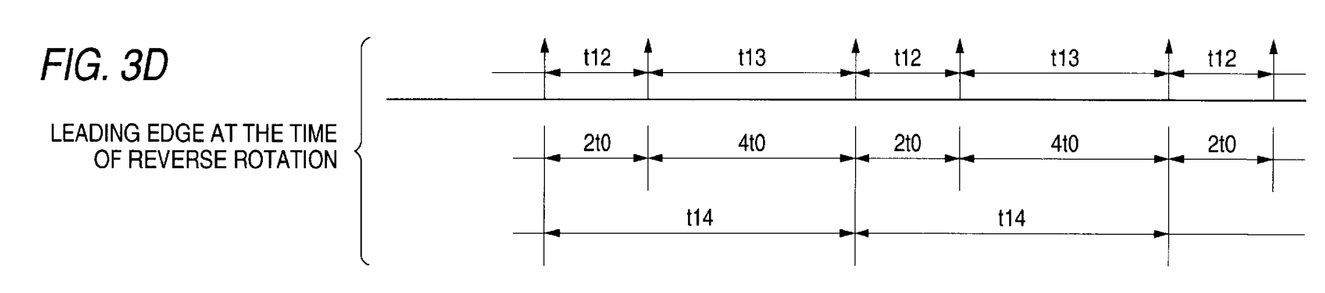

That is, in FIGS. 3A to 3D, when attention is paid to leading edges of the signal at the time of normal rotation of the motor 2 and at the time of reverse rotation of the motor 2, the leading edge interval at the time of normal rotation of the motor 2 is a constant time interval t11 (=3t0) as shown in FIG. 3C whereas the leading edge interval at the time of reverse rotation of the motor 2 (equivalent to the trailing edge interval at the time of normal rotation of the motor 2) alternates between a narrow time interval t12 (=2t0) and a wide time interval t13 (=4t0) as shown in FIG. 3D.

Therefore, the micro-computer 7 always detects only the leading edges. When the leading edge interval is a constant time interval t11 (=3t0), the micro-computer 7 judges that the motor 2 is rotating in the direction of normal rotation. When the leading edge interval alternates between a narrow time internal t12 (=2t0) and a wide time interval t13 (=4t0), the micro-computer 7 judges that the motor 2 is rotating in the direction of reverse rotation. In this manner, detection of only the leading edges of the signal pattern permits the direction of rotation to be judged accurately through simple calculation.

Figure 4A:
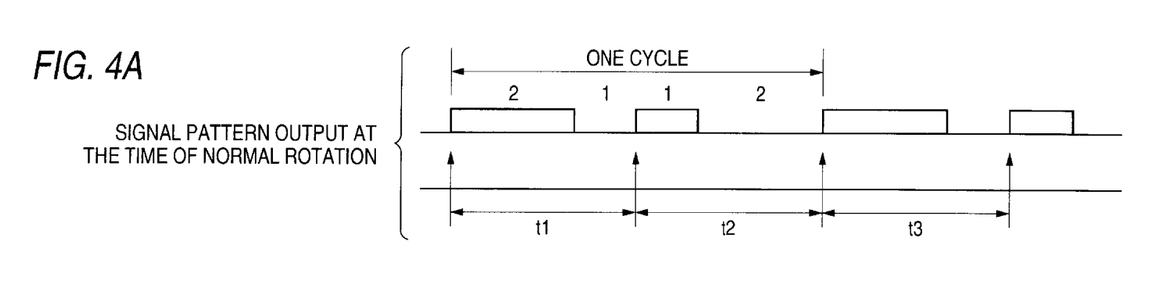
FIGS. 4A to 4C are explanatory views showing waveforms of the signal pattern output at the time of normal rotation of the motor and waveforms of the signal pattern output at the time of reverse rotation of the motor.
Figure 4B:
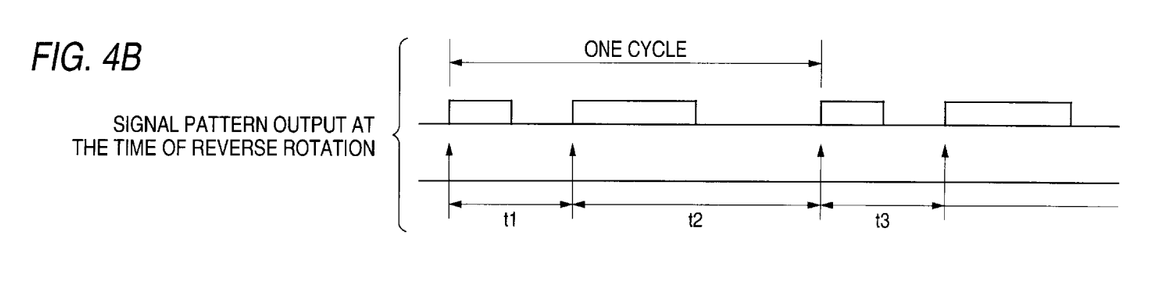
Figure 4C:
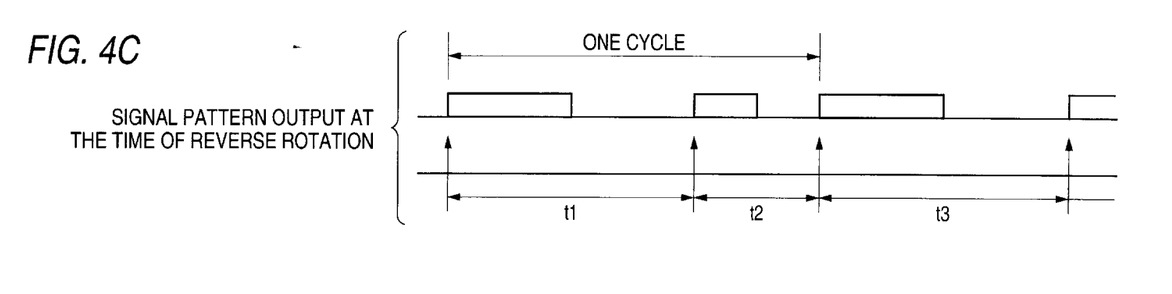
Figure 5:
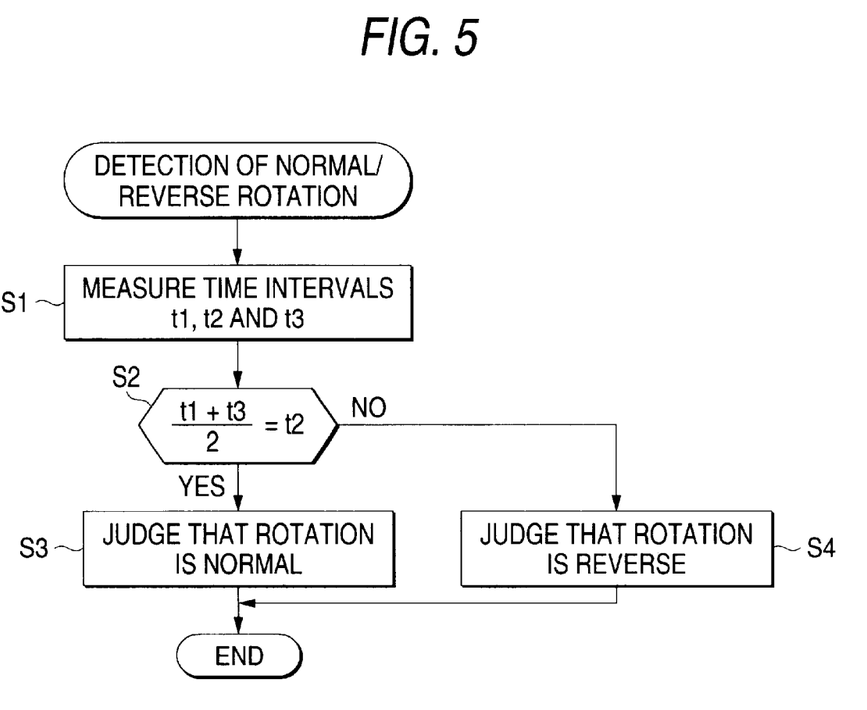
FIG. 5 is a flow chart showing a processing operation for judging the direction of rotation of the motor according to Embodiment 1.
Figure 6:
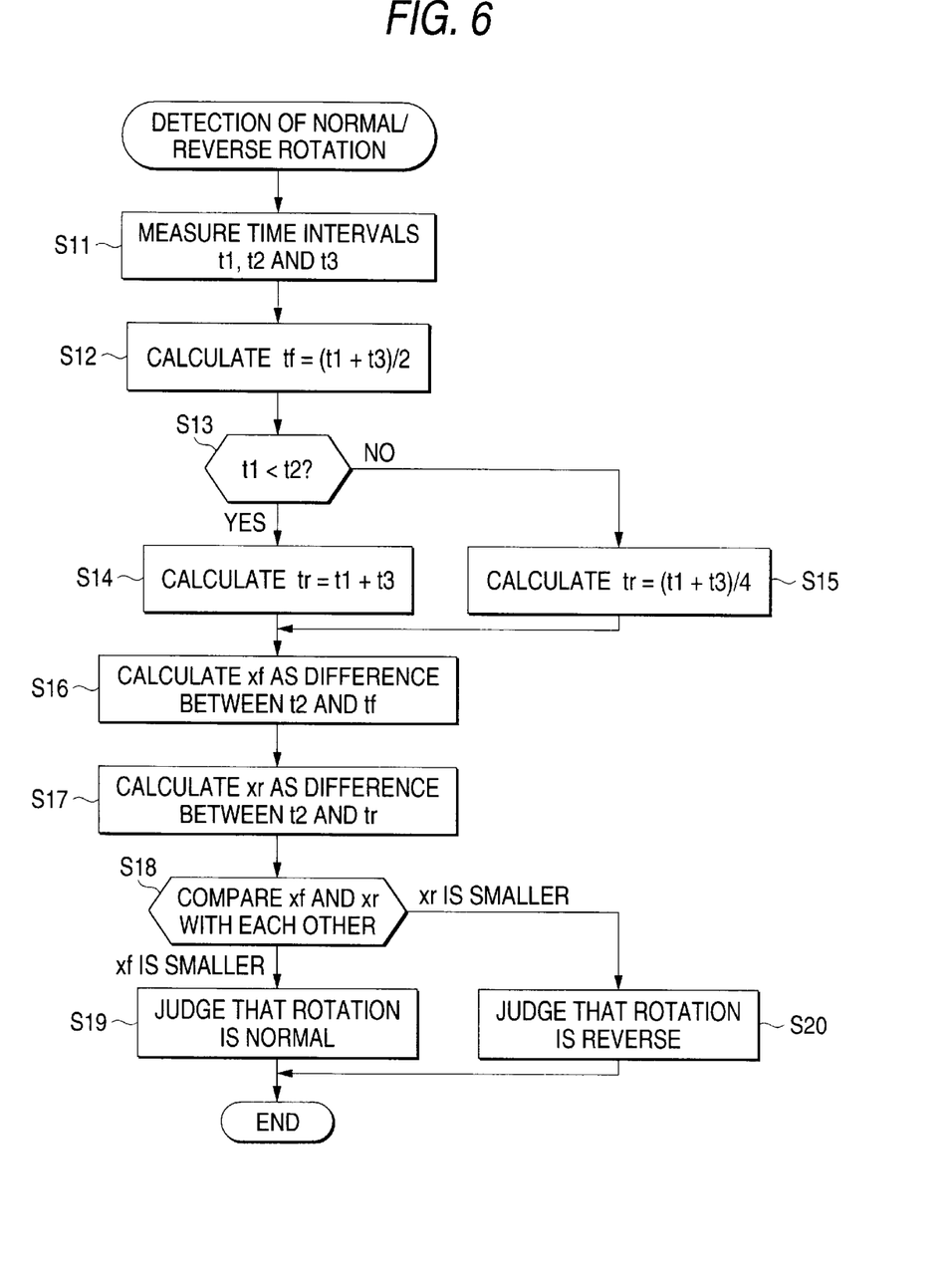
FIG. 6 is a flow chart showing a processing operation for judging the direction of rotation of the motor according to Embodiment 2.

Next, the specific process in which the micro-computer 7 judges the direction of rotation of the motor 2 will be described on the basis of Embodiments 1 and 2 respectively. Incidentally, FIGS. 4A to 4C show a signal pattern (FIG. 4A) output at the time of normal rotation of the motor and signal patterns (FIGS. 4B and 4C) output at the time of reverse rotation of the motor. FIG. 4A corresponds to FIG. 3C. FIGS. 4B and 4C correspond to FIG. 3D. FIG. 5 is a flow chart showing a processing operation corresponding to Embodiment 1. FIG. 6 is a flow chart showing a processing operation corresponding to Embodiment 2.

(Embodiment 1)

When the motor 2 is rotating, the photo-detector 5 outputs a signal shown in FIG. 4A at the time of normal rotation of the motor 2 and outputs signals shown in FIGS. 4B and 4C at the time of reverse rotation of the motor 2.

The micro-computer 7 judges the direction of rotation of the motor 2 on the basis of these signals through the following calculation.

That is, the distance (time interval) between adjacent leading edges is measured three times continuously, so that the measured time intervals are put as t1, t2 and t3 respectively (step S1).

Then, $(t1+t3)/2$ is calculated on the basis of the measured time intervals, so that the calculation result is compared with the time interval t2 (step S2).

The reason why the value obtained by halving the sum of the first and last ones of the leading edge distances (time intervals) obtained in continuous three times measurement is compared with the middle one of the leading edge distances is that the motor 2 does not always rotate at a constant velocity. That is, though the measured time intervals t1, t2 and t3 ought to be always equal to one another when the motor 2 makes normal rotation at a constant velocity, the size sequence of the measured time intervals is t1<t2<t3 in an accelerated state and t1>t2>t3 in a decelerated state. Incidentally, if acceleration or deceleration is constant on this occasion, the value obtained by halving the sum of the first and last ones t1 and t3 of the measured time intervals ought to be equal to the middle one t2 of the measured time intervals because the measured time intervals ought to be elongated at a constant rate.

On the other hand, when the leading edge distance (time interval) is measured three times continuously at any timing in the case where the motor 2 is rotating in the direction of reverse rotation at a constant velocity, the measured time intervals t1, t2 and t3 belong to either one of the case shown in FIG. 4B and the case shown in FIG. 4C. In either case, it is obvious that the measured time intervals satisfy the relation $[(t1+t3)/2] \neq t2$. This relation holds even in the case where the motor 2 is in an accelerated or decelerated state.

In Embodiment 1, therefore, $[(t1+t3)/2]$ is compared with t2 in step S2 in consideration of the relation among the time intervals t1, t2 and t3 obtained in continuous three times measurement. When the comparison result shows that $[(t1+t3)/2]$ is equal to t2 (in the consideration of an error to some extent), the micro-computer 7 judges that the motor 2 is rotating in the direction of normal rotation (step S3).

On the other hand, when the comparison result in the step S2 shows $[(t1+t3)/2] \neq t2$ (in the consideration of an error to some extent), the micro-computer 7 judges that the motor 2 is rotating in the direction of reverse rotation (step S4)

(Embodiment 2)

When the motor 2 is rotating, the photo-detector 5 outputs a signal shown in FIG. 4A at the time of normal rotation of the motor 2 and outputs signals shown in FIGS. 4B and 4C at the time of reverse rotation of the motor 2.

The micro-computer 7 judges the direction of rotation of the motor 2 on the basis of these signals through the following calculation.

That is, the distance (time interval) between adjacent leading edges is measured three times continuously, so that the measured time intervals are put as t1, t2 and t3 respectively (step S11).

Then, tf=(t1+t3)/2 is calculated on the basis of the measured time intervals (step S12). On this occasion, tf=t2 ought to be satisfied when the motor 2 is rotating in the direction of normal rotation where as tf≠t2 ought to be satisfied when the motor 2 is rotating in the direction of reverse rotation. The step S12 is basically provided for obtaining t2 through calculation at the time of normal rotation of the motor 2. Hence, tf at the time of reverse rotation of the motor 2 is a meaningless value.

Then, the micro-computer 7 compares t1 with t2 (step S13) When the comparison result shows t1<t2, the operation goes from the step S13 to step S14 to calculate tr=t1+t3 because the time intervals have been measured at the timing shown in FIG. 4B. When the time intervals have been measured at the timing shown in FIG. 4B, t2 is substantially obtained by calculation in the step S14 because t1+t3=t2 is satisfied.

On the other hand, when the comparison result in the step S13 shows t1>t2, the operation goes from the step S13 to step S15 to calculate tr=(t1+t3)/4 because the time intervals have been measured at the timing shown in FIG. 4C. When the time intervals have been measured at the timing shown in FIG. 4C, t2 is substantially obtained by calculation in the step S15 because (t1+t3)/4=t2 is satisfied.

In the next step S16, the difference xf between t2 actually measured in the step S11 and tf calculated in the step S12 is calculated on the basis of these calculation results. This calculation is provided for obtaining xf=0 through calculation at the time of normal rotation of the motor 2. Hence, xf (>0) is obtained at the time of reverse rotation of the motor 2.

In the next step S17, the difference xr between t2 actually measured in the step S11 and tr calculated in the step S14 or S15 is calculated. This calculation is provided for obtaining xr=0 through calculation at the time of reverse rotation of the motor 2. Hence, xr (>0) is obtained at the time of normal rotation of the motor 2.

In the next step S18, xf and xr obtained thus in the steps S16 and S17 respectively are compared with each other. When the motor 2 is rotating in the direction of normal rotation on this occasion, xf<xr is satisfied because of xf=0 and xr>0. As a result, the operation goes to step S19 in which the micro-computer 7 judges that the motor 2 is rotating in the direction of normal rotation. On the other hand, when the motor 2 is rotating in the direction of reverse rotation, xf>xr is satisfied because of xf>0 and xr=0. As a result, the operation goes to step S20 in which the micro-computer 7 judges that the motor 2 is rotating in the direction of reverse rotation.

As described above, in the rotation direction detecting apparatus according to the invention, only the leading edges of the signal pattern are detected so that the direction of rotation can be judged accurately through simple calculation.

The micro-computer 7 also calculates the rotational velocity of the motor 2 on the basis of the judgment result. That is, when the micro-computer 7 judges that the motor 2 is rotating in the direction of normal rotation, the micro-computer 7 calculates the rotational velocity of the motor 2 on the basis of the middle one t2 of the continuously measured time intervals t1, t2 and t3.

On the other hand, when the micro-computer 7 judges that the motor 2 is rotating in the direction of reverse rotation on the basis of the judgment result, the micro-computer 7 calculates the rotational velocity of the motor 2 on the basis of the sum (t1+t2) of the first two continuous ones of the continuously measured time intervals t1, t2 and t3 (that is, on the basis of the distance t14 (see FIG. 3D) between two leading edges located on opposite outer sides of three continuous leading edges).

That is, when the motor 2 is rotating in the direction of reverse rotation, the distance between adjacent leading edges alternates between a narrow time interval t12 and a wide time interval t13 as shown in FIG. 3D. For this reason, the micro-computer 7 cannot compute the rotational velocity on the basis of only one of the time intervals t12 (t1 in FIG. 4B) and t13 (t2 in FIG. 4B). That is, the micro-computer 7 cannot judge whether the given time interval belongs to the narrow one or the wide one. The distance (time interval) t14 obtained by adding the narrow time interval t12 and the wide time interval t13 (the sum of t1 and t2 in FIGS. 4B and 4C) is, however, constant, so that the rotational velocity can be calculated on the basis of the constant time interval t14 (the constant time interval t1+t2).

On this occasion, as shown in FIGS. 4A to 4C, the time interval t2 as abase of calculation at the time of normal rotation (FIG. 4A) and the time interval (t1+t2) as a base of calculation at the time of reverse rotation (FIGS. 4B and 4C) satisfy the relation:

Normal rotative time interval t2×2=reverse rotative time interval (t1+t2).

Hence, it is necessary to calculate the rotational velocity in the consideration of this relation.

In the rotation direction detecting apparatus according to the invention, a newly devised signal pattern is used so that the direction of rotation can be judged accurately through simple calculation when only the leading edges of the signal pattern are detected. At the same time, the rotational velocity can be obtained accurately through simple calculation when only the leading edges of the signal pattern are detected.

What is claimed is:

1. A rotation direction detecting apparatus comprising:
a turntable mounted on a rotary shaft of a motor and provided with a predetermined signal pattern, said predetermined signal pattern being formed so that one selected from reflection and non-reflection of light and transmission and non-transmission of light is alternately and continuously repeated by rotation of said motor;
a photo-detecting unit for detecting said signal pattern of said turntable;
a rotation direction judging unit for judging a direction of rotation of said motor on the basis of said signal pattern detected by said photo-detecting unit; and
a velocity calculating unit for calculating a rotational velocity of said motor on the basis of the direction of rotation judged by said rotation direction judging unit, wherein
said signal pattern is set as a pattern in which high-level regions and low-level regions are repeated alternately at a 2:1:1:2 ratio;
said rotation direction judging unit judges that said motor is rotating in a direction of normal rotation when leading edges of said signal pattern detected by said photo-detecting unit are arranged at regular intervals, and judges that said motor is rotating in a direction of reverse rotation when leading edges of said signal pattern detected by said photo-detecting unit are arranged at irregular intervals; and said velocity calculating unit calculates the rotational velocity of said motor on the basis of a distance between adjacent leading edges when said rotation direction judging unit judges that said motor is rotating in the direction of normal rotation, and calculates the rotational velocity of said motor on the basis of a distance between two leading edges located on opposite outer sides of three continuous leading edges when said rotation direction judging unit judges that said motor is rotating in the direction of reverse rotation.

2. A rotation direction detecting apparatus comprising:

a turntable mounted on a rotary shaft of a motor and provided with a predetermined signal pattern, said predetermined signal patter being formed so that one selected from reflection and non-reflection of light and transmission and non-transmission of light is alternately and continuously repeated by rotation of said motor;

a photo-detecting unit for detecting said signal pattern of said turntable; and a rotation direction judging unit for judging a direction of rotation of said motor on the basis of said signal pattern detected by said photo-detecting unit and constituted by repetition of high- and low-level regions, wherein said signal pattern is set so that adjacent leading edges of said signal pattern are arranged at regular intervals at the time of normal rotation of said motor, and adjacent trailing edges of said signal pattern are arranged at intervals each having a value different from that of each of said regular intervals at the time of normal rotation of said motor; and said rotation direction judging unit judges the direction of rotation of said motor on the basis of a judgment as to whether leading edges of said signal pattern detected by said photo-detecting unit are arranged at regular intervals or at irregular intervals.

3. The rotation direction detecting apparatus according to claim 2, wherein said rotation direction judging unit judges that said motor is rotating in a direction of normal rotation when leading edges of said signal pattern detected by said photo-detecting unit are arranged at regular intervals, and judges that said motor is rotating in a direction of reverse rotation when leading edges of said signal pattern detected by said photo-detecting unit are arranged at irregular intervals.

4. The rotation direction detecting apparatus according to claim 2, wherein said signal pattern is set as a pattern in which high-level regions and low-level regions are repeated alternately at a 2:1:1:2 ratio.

5. The rotation direction detecting apparatus according to claim 2, further comprising:

a velocity calculating unit for calculating a rotational velocity of said motor on the basis of a distance between adjacent leading edges, when said rotation direction judging unit judges that said motor is rotating in the direction of normal rotation.

6. The rotation direction detecting apparatus according to claim 2, further comprising:

a velocity calculating unit for calculating a rotational velocity of said motor on the basis of a distance between two leading edges located on opposite outer sides of three continuous leading edges, when said rotation direction judging unit judges that said motor is rotating in the direction of reverse rotation.

* * * * *